P. E. ERICKSON.
HOSE CLAMP.
APPLICATION FILED OCT. 18, 1912.
1,070,952.
Patented Aug. 19, 1913.
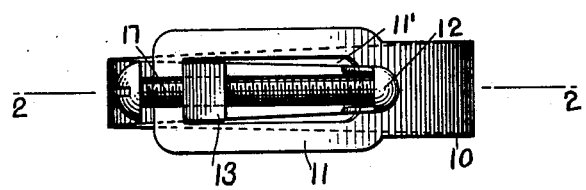
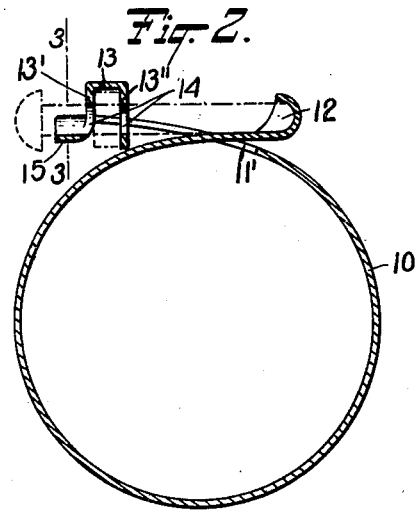
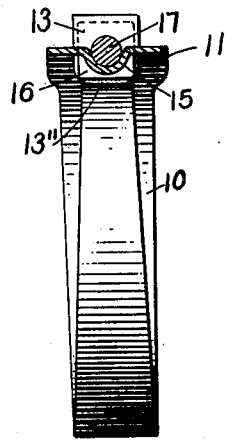
WITNESSES
INVENTOR
Peter E. Erickson,
BY
ATTORNEYS

UNITED STATES PATENT OFFICE.

PETER E. ERICKSON, OF PORT CHESTER, NEW YORK.

HOSE-CLAMP.

1,070,952.   Specification of Letters Patent.   Patented Aug. 19, 1913.

Application filed October 18, 1912. Serial No. 726,408.

*To all whom it may concern:*

Be it known that I, PETER E. ERICKSON, a citizen of the United States, and a resident of Port Chester, in the county of Westchester and State of New York, have invented a new and Improved Hose-Clamp, of which the following is a full, clear, and exact description.

This invention relates to hose clamps of the character described and claimed in Letters Patent of the United States issued to me on February 9, 1909, No. 912,097, the invention comprising a band of tough flexible metal, the ends of which overlap or cross each other, and the provision of a peculiar means for supporting a clamping screw whose function is to spread the crossed ends of the band to thereby tighten the band upon the hose or other means being clamped.

Among the objects of the present invention is to so improve this type of hose clamps as to increase the efficiency thereof and cheapen their production.

A further object of the invention is to make the hose clamp more compact in proportion to its general contour and strength and thereby render the device less liable to damage or disturbance from outside obstructions or influences.

The foregoing and other objects of the invention will hereinafter be fully described and claimed and illustrated in the drawings accompanying this specification in which like characters of reference indicate corresponding parts in all the views, and in which—

Figure 1 is a plan view of the clamp made in accordance with a preferred embodiment of this invention; Fig. 2 is a vertical central transverse section on the line 2—2 of Fig. 1; and Fig. 3 is a side elevation, partly in section, on the line 3—3 of Fig. 2.

Referring particularly to the drawings, I show at 10 a band of suitable tough flexible metal preferably of uniform thickness throughout. One end 11 of the band constitutes a head substantially rectangular in outline, as indicated in Fig. 1, and is so punched or stamped as to form an eye 11'. Said band, as it leaves one end of the head, is slightly tapered and it terminates at its other end in a cup 12 which is adapted to pass through the aforesaid eye while assembling the clamp or putting it in place, the flexibility of the metal permitting such operation. The cup 12 is pressed or stamped out of the same body of metal as the remaining portions of the band.

The metal punched out to form the eye 11' constitutes a tongue constructed or bent into a substantially U-shaped socket 13, one side member 13' of the socket remaining integral with the free end of the head 11 and the other side member 13" of the socket or free end of the tongue of metal extending inwardly through the eye 11' substantially parallel to the side member 13'. The side members 13' and 13" are punched to form alined holes 14 and the end of the head adjacent thereto is swaged downwardly at 15 substantially cylindrically, the axis of the cylinder being coincident with the axes of the holes 14.

A nut 16 is seated and held in the socket 13, its threaded bore being in alinement with the aforesaid holes of the socket 13, and coöperating with said nut is a clamping screw 17 which passes through the holes and nut and bears at its inner end in said cup 12. The loop or crotch of the socket 13, being on the outer side of the clamp ring or band 10, provides a neat, compact, and exceedingly strong construction having no sharp or angular projections. It will be apparent, therefore, that not only will the nut 16 be held in its socket by means of the screw, but the arrangement of the side members 13' and 13" of the socket will coöperate in such a manner with the screw as to provide a device having the capability of withstanding all of the strains to which the clamp will be subjected. In other words, the screw is adapted to bear not only upon the cylindrical portion 15 of the end of the head, but also upon the free end of the side member 13" of the socket, making a substantial anchorage for the screw in its coöperation with the other parts of the band. It will be impossible, therefore, under any ordinary circumstances, for the screw to be distorted from its intended position. It is to be noted also that the clamping screw will lie substantially snugly against that portion of the band which engages the hose or other device being clamped, whereby the maximum effective strength of the clamp will be attained.

A clamp made in accordance with this invention will not only be possessed of the maximum strength in proportion to the amount of material employed, but the element of cheapness of construction is materially enhanced by reason of the fact that there will be practically no waste metal in its formation. The metal stamped out to form the eye 11' will constitute the walls of the socket member 13 and no alteration of shape thereof will be necessary beyond the bending up to bring the two sides at right angles to the longitudinal axis of said head. The depression 15 also may be formed in the act of pressing the metal without materially distorting the other portions of the head. The screw and nut may be of any conventional construction and no alteration thereof is necessary to adapt them to the band in the manner above set forth.

The operation of the clamp may be briefly described as follows: The nut 16 being slipped into the socket 13 from the inner side of the head and the screw placed in position with its point leading through the nut and holes 14, the band will be put in place with the cup end passed around the object being clamped and slipped into or through the eye 11'. The screw is then turned to bring its point into the cup and the screw will be turned obviously to a degree sufficient to effect the proper clamping result.

Having thus described my invention, what I claim as new and desire to secure by Letters Patent, is:—

The herein described hose clamp comprising, in combination, a metallic band, one end of which constitutes a head, a portion of the metal of the head being punched out as a tongue and bent to form a substantially U-shaped socket, one end of the tongue constituting a wall of the socket being integral with the head and the free end of the tongue constituting the other wall of the socket, and the other end of the band being adapted to pass through the eye formed by the bending out of said socket structure, and means to force the ends of the band apart, said means comprising a screw passing through both walls of said socket and bearing upon the other end of the band.

In testimony whereof I have signed my name to this specification in the presence of two subscribing witnesses.

PETER E. ERICKSON.

Witnesses:
 ELSIE C. HARE,
 WM. O. REMSEN.